US009807686B2

(12) United States Patent
Abdel-Samad et al.

(10) Patent No.: US 9,807,686 B2
(45) Date of Patent: Oct. 31, 2017

(54) MEASUREMENTS TO AID RAPID IDENTIFICATION OF NEIGHBOR CELLS

(71) Applicant: BlackBerry Limited, Waterloo (CA)

(72) Inventors: Ayman Ahmed Mahmoud Abdel-Samad, Waterloo (CA); Claude Jean-Frederic Arzelier, Molieres-sur-Ceze (FR); Dinesh Kumar Arora, Kitchener (CA); Mohamed Galal El-Din Ebrahim, Waterloo (CA); Takashi Suzuki, Ichikawa (JP)

(73) Assignee: BlackBerry Limited, Waterloo, Ontario (CA)

( * ) Notice: Subject to any disclaimer, the term of this patent is extended or adjusted under 35 U.S.C. 154(b) by 148 days.

(21) Appl. No.: 14/952,666

(22) Filed: Nov. 25, 2015

(65) Prior Publication Data

US 2016/0081021 A1 Mar. 17, 2016

Related U.S. Application Data

(63) Continuation of application No. PCT/US2014/040338, filed on May 30, 2014.

(30) Foreign Application Priority Data

May 31, 2013 (EP) .................................. 13305729

(51) Int. Cl.
*H04W 52/02* (2009.01)
*H04W 4/22* (2009.01)
(Continued)

(52) U.S. Cl.
CPC ......... *H04W 52/0209* (2013.01); *H04W 4/22* (2013.01); *H04W 36/0061* (2013.01); *H04W 64/006* (2013.01); *Y02B 60/50* (2013.01)

(58) Field of Classification Search
None
See application file for complete search history.

(56) References Cited

U.S. PATENT DOCUMENTS 8,422,988 B1 4/2013 Keshav
2010/0297955 A1* 11/2010 Marinier ........... H04W 36/0061
455/73

(Continued)

FOREIGN PATENT DOCUMENTS

EP 2611232 A1 7/2013
WO 2012026053 A1 3/2012

OTHER PUBLICATIONS

ETSI TS 136 331 V11.3.0; LTE; Evolved Universal Terrestrial Radio Access (E-UTRA); Radio Resource Control (RRC); Protocol Specification (3GPP TS 36.331 V11.3.0; Release 11); Apr. 2013; 348 pages.

(Continued)

*Primary Examiner* — Brian Roberts
(74) *Attorney, Agent, or Firm* — Conley Rose, P.C.; J. Robert Brown, Jr.; Albert A. Abbou

(57) ABSTRACT

A method for communication in a wireless telecommunications system is provided. The method comprises performing, by a UE, responsive to the UE being engaged in an emergency service, at least one neighbor cell measurement regardless of a value of an RSRP in relation to a cell measurement parameter and regardless of a configuration status of the cell measurement parameter.

15 Claims, 9 Drawing Sheets

(51) Int. Cl.
*H04W 36/00* (2009.01)
*H04W 64/00* (2009.01)

(56) References Cited

U.S. PATENT DOCUMENTS

| 2011/0002281 A1* | 1/2011 | Terry | H04W 76/048 |
| | | | 370/329 |
| 2011/0212693 A1* | 9/2011 | Sagfors | H04W 36/0083 |
| | | | 455/67.11 |

OTHER PUBLICATIONS

European Extended Search Report; Application No. 13305729.9; dated Nov. 13, 2013; 8 pages.
PCT International Search Report; Application No. PCT/US2014/040338; dated Aug. 11, 2014; 4 pages.
PCT Written Opinion of the International Searching Authority; Application No. PCT/US2014/040338; dated Aug. 11, 2014; 9 pages.
European Examination Report; Application No. 14737071.2; dated Feb. 3, 2017; 4 pages.

* cited by examiner

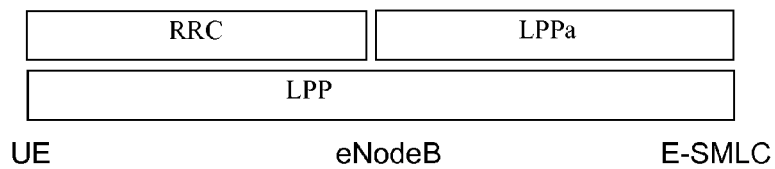

Fig. 3 (prior art)

```
4> if s-Measure is not configured; or
4> if s-Measure is configured and the Pcell RSRP, after layer 3 filtering,
is lower than this value:
    5> perform the corresponding measurements of neighbouring cells on
    the frequencies and RATs indicated in the concerned measObject,
    applying for neighbouring cells on the primary frequency the time
    domain measurement resource restriction in accordance with
    measSubframePatternConfigNeigh, if configured in the concerned
    measObject;
```

Fig. 4 (prior art)

```
If a PDN connection for emergency bearer services is established {
    a. RRC establishes RRC connection if required.
    b. RRC marks s-Measure in varMeasConfig as "disabled".
    c. RRC starts intra-frequency measurements.
    d. if measGap is configured {
      RRC starts inter-frequency measurements.
         e. if (measurement objects are configured) {
             Start Inter freq measurements using measurement object based
             freqs
         } else (if SIB5 of serving cell is available) {
             Start Inter freq measurements using SIB5 based freqs
         }
    }
    f. RRC regularly collects intra/inter-frequency measurements from
    Layer1
    g. RRC receives E-CID Location Information request and provides
    measurement results acquired so far.
}
```

Fig. 5

```
After an RRC Connection is established with establishment cause
"emergency", or if an RRC Connection already exists and a PDN connection
for emergency bearer services is established {
    a. RRC establishes connection if required.
    b. RRC marks s-Measure in varMeasConfig as "disabled".
    c. RRC starts intra-frequency measurements.
    d. if measGap is configured {
      RRC starts inter-frequency measurements.
         e. if (measurement objects are configured) {
             Start Inter freq measurements using measurement object based
             freqs
         } else (if SIB5 of serving cell is available) {
             Start Inter freq measurements using SIB5 based freqs
         }
    }
    f. RRC regularly collects intra/inter-frequency measurements from
    Layer1
    g. RRC receives E-CID Location Information request and provides
    measurement results acquired so far.
}
```

Fig. 6

```
4> if s-Measure is not configured; or
4> if s-Measure is configured and the serving cell RSRP, after layer 3
   filtering, is lower than this value; or
4> if s-Measure is configured and a PDN connection for emergency bearer
   services is established:
     5> perform the corresponding measurements of neighbouring cells on
        the frequencies and RATs indicated in the concerned measObject;
```

Fig. 7

```
4> if s-Measure is not configured; or
4> if s-Measure is configured and the serving cell RSRP, after layer 3
   filtering, is lower than this value; or
4> if a PDN connection for emergency bearer services is established:
     5> perform the corresponding measurements of neighbouring cells on
        the frequencies and RATs indicated in the concerned measObject;
```

Fig. 8

```
NOTE 3:    The s-Measure defines when the UE is required to perform
measurements. The UE is however allowed to perform measurements also when
the PCell RSRP exceeds s-Measure, e.g., to measure cells broadcasting a
CSG identity following use of the autonomous search function as defined in
TS 36.304 [4] or when one or more PDN connection(s) for emergency bearers
is established.
```

Fig. 9

```
4> if s-Measure is not configured; or
4> if s-Measure is configured and the serving cell RSRP, after layer 3
filtering, is lower than this value:
    5> perform the corresponding measurements of neighbouring cells on the
    frequencies and RATs indicated in the concerned measObject;
    NOTE:  As an implementation option, the UE can if the battery power is
high enough trigger measurements regardless of s-Measure, if the
Connection Establishment cause is "Emergency" or one or more PDN
connection(s) is(are) established for emergency bearer services, in order
to allow early positioning information.
```

Fig. 10a

```
4> if s-Measure is not configured; or
4> if s-Measure is configured and the serving cell RSRP, after layer 3
filtering, is lower than this value; or
4> if the Connection Establishment cause is "Emergency" or one or more PDN
connection(s) is(are) established for emergency bearer services:
    5> perform the corresponding measurements of neighbouring cells on the
    frequencies and RATs indicated in the concerned measObject;
    NOTE:  measurements due to Connection Establishment "Emergency" or PDN
    connection(s) for emergency bearer services could be performed only if
    the battery is high enough, as an implementation option.
```

Fig. 10b

```
a. RRC maintains idle mode measurements with the time stamp based
information.
b. RRC moves to connected mode (RRC_CONNECTED).
c. RRC receives E-CID Location Information request from higher layer
and in case RRC has not yet acquired the neighbour cell measurements
in the connected mode, it can re-use idle mode measurements acquired
in last T_thresh to be passed to the higher layers.
```

Fig. 11

The UE initiates the procedure when upper layers request establishment of an RRC connection while the UE is in RRC_IDLE.

Upon initiation of the procedure, the UE shall:

1> if upper layers indicate that the RRC connection is subject to EAB, see TS 24.301 [35]:

2> if the result of the EAB check, as specified in 5.3.3.12, is that access to the cell is barred:

3> inform upper layers about the failure to establish the RRC connection and that EAB is applicable, upon which the procedure ends;

1> if the UE is establishing the RRC connection for mobile terminating calls:

2> if timer T302 is running:

3> inform upper layers about the failure to establish the RRC connection and that access barring for mobile terminating calls is applicable, upon which the procedure ends;

1> else if the UE is establishing the RRC connection for emergency calls:

2> if *SystemInformationBlockType2* includes the *ac-BarringInfo*:

3> if the *ac-BarringForEmergency* is set to *TRUE*:

4> if the UE has one or more Access Classes, as stored on the USIM, with a value in the range 11..15, which is valid for the UE to use according to TS 22.011 [10] and TS 23.122 [11]:

NOTE 1: ACs 12, 13, 14 are only valid for use in the home country and ACs 11, 15 are only valid for use in the HPLMN/ EHPLMN.

5> if the *ac-BarringInfo* includes *ac-BarringForMO-Data*, and for all of these valid Access Classes for the UE, the corresponding bit in the *ac-BarringForSpecialAC* contained in *ac-BarringForMO-Data* is set to *one*:

6> consider access to the cell as barred;

4> else:

5> consider access to the cell as barred;

2> if access to the cell is barred:

3> inform upper layers about the failure to establish the RRC connection, upon which the procedure ends;

2> else *preserve the intra-frequency and inter-frequency measurements made in idle mode for the purpose of immediate E-CID measurement reporting.*

MEASUREMENTS TO AID RAPID IDENTIFICATION OF NEIGHBOR CELLS

CROSS-REFERENCE TO RELATED APPLICATIONS

This application is a continuation application of International Application No. PCT/US2014/040338 filed May 30, 2014, entitled "Measurements to Aid Rapid Identification of Neighbor Cells," (46231-WO-PCT—4214-41201), which claims priority to European Application No. 13305729.9 filed May 31, 2013, entitled "Measurements to Aid Rapid Identification of Neighbor Cells," (46231-EP-EPA—4214-41200), which are incorporated by reference herein as if reproduced in their entirety.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user device," "mobile equipment," "mobile station," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component may be referred to herein as an eNB, but it should be understood that such a component is not necessarily an eNB. Such a component may also be referred to herein as a network node. Actions described herein as being taken by a network may be understood as being taken by an eNB or a similar network node.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11. As used herein, the terms "legacy", "legacy UE", and the like might refer to signals, UEs, and/or other entities that comply with LTE Release 9 and/or earlier releases but do not comply with releases later than Release 9. The terms "advanced", "advanced UE", and the like might refer to signals, UEs, and/or other entities that comply with LTE Release 10 and/or later releases.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates examples of protocol terminations in the example of LTE, according the prior art.

FIG. 4 illustrates wording related to the s-Measure criterion, according the prior art.

FIG. 5 illustrates wording related to the s-Measure criterion, according to an embodiment of the disclosure.

FIG. 6 illustrates wording related to the s-Measure criterion, according to an alternative embodiment of the disclosure.

FIG. 7 illustrates wording related to the s-Measure criterion, according to another alternative embodiment of the disclosure.

FIG. 8 illustrates wording related to the s-Measure criterion, according to another alternative embodiment of the disclosure.

FIG. 9 illustrates wording related to the s-Measure criterion, according to another embodiment of the disclosure.

FIGS. 10a and 10b illustrate wording related to the s-Measure criterion, according to another embodiment of the disclosure.

FIG. 11 illustrates wording related to idle mode measurements, according to an embodiment of the disclosure.

FIG. 12 illustrates additional wording related to idle mode measurements, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments may be described herein in the context of an LTE wireless network or system but may be adapted for other wireless networks or systems.

Embodiments of the present disclosure provide improved techniques for determining the physical location of a UE. Obtaining accurate information in a timely manner regarding the geographical location and/or velocity of a UE may be useful in providing emergency services to the user of the UE. That is, when the UE user contacts an emergency service provider, it may be beneficial for the provider to be able to determine the location of the user based on the location of the user's UE. The term "emergency service" will be used herein to refer to any type of contact, such as a phone call, that a user makes with an emergency service provider. A UE may be considered to have started an emergency service after a radio resource control (RRC) connection is established for an emergency service or an emergency bearer. The UE may also be considered to have started an emergency service at any time after an RRC connection already exists and an emergency service or emergency bearer is set up on the already existing RRC connection.

Figure 1:
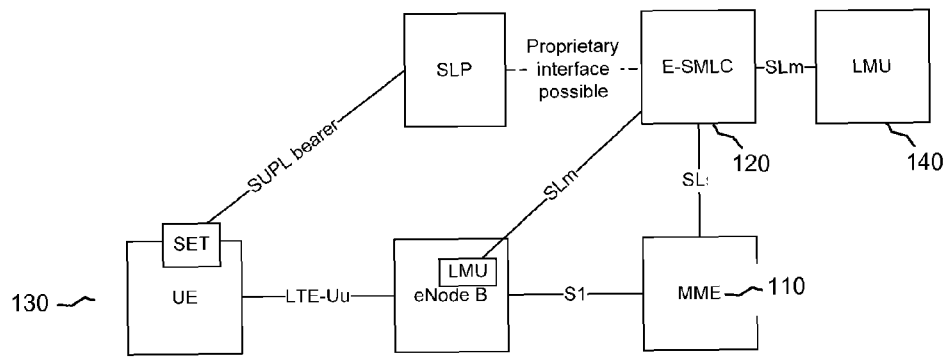
FIG. 1 is a diagram of an architecture for UE positioning applicable to E-UTRAN/LTE, according to the prior art.

FIG. 1, extracted from 3GPP Technical Specification (TS) 36.305, "Evolved Universal Terrestrial Radio Access Network (E-UTRAN); Stage 2 functional specification of User Equipment (UE) positioning in E-UTRAN", version 11.3.0, Mar. 18, 2013, depicts an architecture for obtaining UE positioning in LTE or E-UTRAN. A Mobility Management Entity (MME) 110 or Core Network Packet Switch node forwards to a Location Server E-SMLC (enhanced serving mobile location center) 120 a request to obtain a UE's location that the MME 110 received from another entity, such as a Gateway Mobile Location Center (GMLC) or a UE 130, or from the MME 110 itself (for an IP Multimedia Subsystem (IMS) emergency call from the UE 130, for example). In some cases, the E-SMLC 120 may transfer some data to a Location Measurement Unit (LMU) 140. Once the E-SMLC 120 has obtained the positioning information, the E-SMLC 120 returns the information to the MME 110. The MME 110 may in turn return the information to another entity if the request was initiated by an entity other than the MME, such as the UE 130. Similar principles may apply to location servers other than the E-SMLC 120. Hence, the embodiments disclosed herein are not limited to the architecture of FIG. 1 and may apply to implementations that do not make use of a specific network node for a location server.

According to 3GPP TS 36.305, various methods may be used to obtain accurate location information for a UE, such as Enhanced Cell ID methods (E-CID), a Network Assisted Global Navigation Satellite System (A-GNSS), a Downlink Observed Time Difference of Arrival (OTDOA) method, or an Uplink Time Difference of Arrival (UTDOA) method. Several of these positioning methods make use of information related to serving cell and/or neighbor cell UE measurements that are already computed and/or provided by the UE for other reasons in RRC management, such as information related to the quality or power of cells and/or associated with the frequency, Physical Cell ID, or Cell Global ID of the cells.

Figure 2:
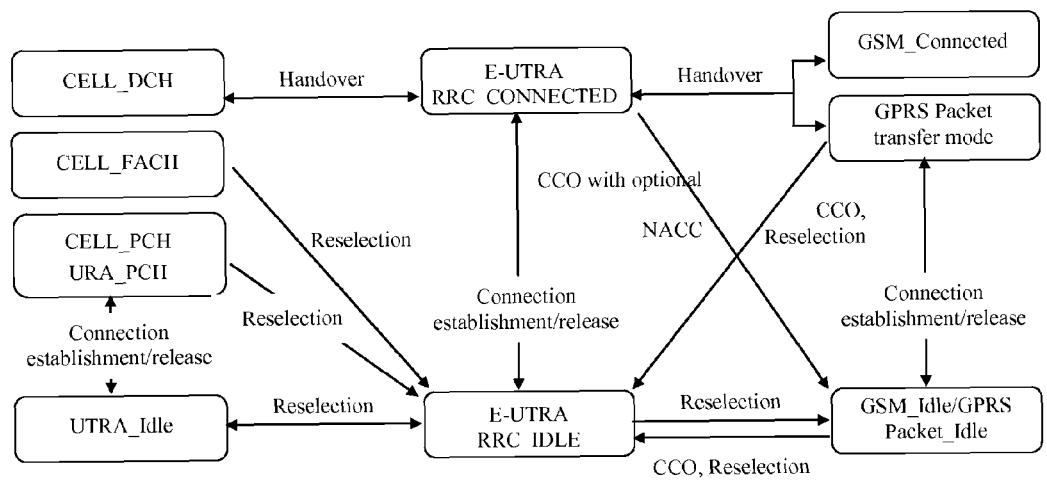
FIG. 2 illustrates E-UTRA states and inter-RAT mobility procedures in 3GPP, according the prior art.

3GPP TS 36.331, "Evolved Universal Terrestrial Radio Access (E-UTRA); Radio Resource Control (RRC); Protocol specification", version 11.3.0, Mar. 18, 2013, defines the Radio Resource Protocol between a UE and E-UTRAN. FIG. 2, extracted from 3GPP TS 36.331, illustrates E-UTRA states and inter-RAT mobility procedures in 3GPP. In connected mode (RRC_CONNECTED), transfer of unicast data to or from a UE may occur. If a UE is not in connected mode, the UE is in idle mode (RRC_IDLE). In the 3GPP TS 36.331 protocol, in idle mode, the UE performs measurements on LTE cells on frequencies that were indicated by the network in the System Information Block 5 (SIB5). The measurements may include LTE inter-frequency measurements. While the UE is in connected mode, the UE performs measurements and reporting based on the measurement object configurations that were indicated to the UE by the network in the RRC Connection Reconfiguration message. The network may configure the UE to report the Reference Signal Received Power (RSRP) and/or Reference Signal Received Quality (RSRQ) associated with the frequencies reported, as well as the Physical Cell ID and Cell Global ID of the associated reported cells and the reception/transmission time difference of the serving cell as seen from the UE. The UE reception time is the time of reception of a downlink radio frame as defined by the first detected path in time. The UE transmission time is the time of transmission of that uplink radio frame. Such information allows the network to deduct the round trip time of a signal and promotes a better assessment of the UE's position based on the computed distance between the UE and the serving cell.

In the case of the E-CID methods, such information may be provided directly from the UE to the E-SMLC via the LTE Positioning Protocol (LPP) defined in 3GPP TS 36.355, "Evolved Universal Terrestrial Radio Access (E-UTRA); LTE Positioning Protocol (LPP)", version 11.2.0, Mar. 18, 2013, and/or via the user plane Open Mobile Alliance (OMA) "Secure User Plane Location" (SUPL) protocol, version 2.0, Dec. 5, 2012. Alternatively, such information may be sent from the eNB to the E-SMLC via the LTE Positioning Protocol Annex (LPPa) defined in 3GPP TS 36.455 "Evolved Universal Terrestrial Radio Access (E-UTRA); LTE Positioning Protocol A (LPPa)", version 11.2.0, Mar. 18, 2013. Additional parameters computed by the eNB using the initial parameters may also be included with such information. In the UE-assisted case, the UE receives a request from the E-SMLC via the LPP protocol and replies to the request with the requested information or a subset of the requested information if all of the information is not available. Some examples of protocol terminations at LTE network components are shown in FIG. 3.

From the above discussion, it may be seen that positioning methods, such as the LPP Protocol for the E-CID method, can reuse the measurement processing or reporting already provided by the UE for RRC in connected mode, such as RSRP and RSRQ. UE positioning accuracy may be greatly improved if the amount of E-CID information related to measurements on neighbor cells increases.

Several deficiencies may exist in the current positioning procedures that use existing measurement processing or reports. First, neighbor cell measurements are not always required. According to 3GPP TS 36.331, a UE is required to commence neighbor cell measurements based on an eNB-provided measurement configuration. As part of the measurement configuration, the eNB provides a list of neighbor frequencies as well as the s-Measure threshold value. The s-Measure criterion defines when the UE is required to perform measurements. The conditions for performing measurements are stated in Section 5.5.3.1 of 3GPP 36.331 and are shown in FIG. 4.

It may be seen from FIG. 4 that, if s-Measure is configured, a UE is not required to measure neighbor cells unless the serving cell's RSRP is below the s-Measure threshold. Thus, a UE typically will not perform neighbor cell measurements if the UE is not required to do so. This approach is intended to avoid unnecessary battery consumption by a UE that is not expected to be handed over to a new cell under existing good radio conditions. When the UE is in good coverage, the serving cell's RSRP typically will be above s-Measure, and hence the UE will not have any neighbor cell measurements to report if an E-CID Location Information request is received. This absence of neighbor cell measurements may reduce the accuracy of a UE position estimation that is used for location-based services.

Another potential deficiency involves the availability of a neighbor cell cellGlobalId. The cellGlobalId of a cell is transmitted in the SystemInformationBlockType1 (SIB1) message from a network node, such as an eNB. While in RRC connected mode, a UE performs cellGlobalId reception only as part of the cellGlobalId reporting configured by the eNB. That is, a SIB1 message from a neighbor cell that was previously available to the UE may be examined and decoded at a later time. As a result, at the time of an E-CID Location Information request, the UE may not necessarily have a neighbor cell's cellGlobalId. If the UE starts collecting the cellGlobalId for the already measured neighbor cells only upon reception of an E-CID Location Information request, the UE's response may be delayed because the required information is not readily available.

Even though neighbor cell measurements and cellGlobalId may be beneficial when the positioning of a UE is requested for emergency services, reporting of cellGlobalId is not mandated. Physical cell identities (PCI) may contain some ambiguity because two different cells can have the same PCI. Using cellGlobalId may resolve such ambiguity because cellGlobalId uniquely identifies a cell within a public land mobile network (PLMN).

A further problem is that, during E-CID reporting, a UE may be constrained to use a measurement configuration that was originally meant for handover purposes. The UE may be requested to report cellGlobalId only, e.g., on the cell considered for the handover and will not report cellGlobalId for neighbor cells.

In addition, the cell corresponding to cellGlobalId may be a femto cell deployed by a party other than the carrier. A femto cell may also be referred to as a Closed Subscriber Group (CSG), a Home-NodeB, or a Home-eNodeB. As used herein, the term "femto cell" may refer to any such cell. Since femto cells are not part of the planned deployment of the carrier and since the user may move the femto cell apparatus, the location of a femto cell may not be precisely known by the carrier.

As mentioned above, the current specifications governing connected measurements are mainly concerned with saving battery power and facilitating connected mobility. If followed strictly by the UE, these specifications may limit the usefulness of positioning procedures such as E-CID or any other methods making use of information reported by the UE, such as some of the methods mentioned above.

At least five sets of embodiments are disclosed herein for improving the performance of techniques for determining the location of a UE. The E-CID method will be discussed hereinafter as an example, but the embodiments may be applicable to any of the other methods mentioned above. The sets of embodiments may be implemented independently of one another or may be implemented in various combinations with one another.

A first set of embodiments is directed toward obtaining neighbor cell measurements upon the start of an emergency service. In an embodiment, when a UE starts an emergency service, the UE ignores the s-Measure threshold parameter if that parameter was configured in measConfig by the eNB. This embodiment may be disabled when the emergency service terminates. Ignoring the s-Measure threshold parameter allows the UE to immediately begin taking neighbor cell measurements and storing the measurements for immediate reporting in case E-CID location information is requested, e.g., by a higher layer. This may avoid delays in reporting neighbor cell measurements. Such delays in setting up measurements may occur due to the underlying RRC connection setup delays and/or to the eNB not sending a measurement configuration for neighbor frequencies after seeing that the current serving cell measurements are good. In a further embodiment, to ensure that the emergency service is not affected, the s-Measure embodiment may apply only if the UE has sufficient battery power and/or if the UE does not benefit from power saving and/or if the UE is connected to a power supply.

In an embodiment, when the UE starts an emergency service, the UE always performs measurements on intra-frequency neighbors and additionally measures inter-frequency neighbors if measGap is configured. In another embodiment, the UE also measures inter-frequency neighbors even when measGap is not configured. According to 3GPP TS 36.133, "Evolved Universal Terrestrial Radio Access (E-UTRA); Requirements for support of radio resource management", version 11.4.0, Mar. 22, 2013, "If the UE requires measurement gaps to identify and measure inter-frequency and/or inter-RAT cells, in order for the requirements in the following subsections to apply the E-UTRAN must provide a single measurement gap pattern with constant gap duration for concurrent monitoring of all frequency layers and RATs. During the measurement gaps the UE: shall not transmit any data [and] is not expected to tune its receiver on the E-UTRAN serving carrier frequency." These embodiments may be used independently or in conjunction with the s-Measure embodiment disclosed above.

A further embodiment may be used independently of or in conjunction with the s-Measure embodiment disclosed above. This embodiment may be enabled when an emergency service is started and disabled when the emergency service terminates. In this embodiment, the UE makes use of some or all of the existing discontinuous reception (DRX) configurations in order to perform intra-frequency and/or inter-frequency measurements. The DRX configurations may have been initially provided to the UE in order to reduce battery consumption when a decrease in data traffic was detected. This embodiment may apply in addition to the already provided measurement gaps, if any. Currently, the UE is not expected to perform inter-frequency measurements if measurement gaps are not provided. Inter-frequency measurement requirements when DRX is not configured are governed by what the UE can measure during measurement gaps. On the other hand, when DRX is configured, these requirements are not necessarily tightened because the purpose of DRX is to allow the UE to save battery power and not perform more measurements. The UE can strike a balance between battery saving and using DRX to perform measurements.

The autonomous gaps feature was introduced in Release 9 of 3GPP and is a mechanism that allows a UE to make its own decisions to drop downlink reception and uplink transmission for higher priority activities such as Master Information Block (MIB) and SIB1 reception of a neighbor cell for cellGlobalId reporting. According to 3GPP TS 36.331, if autonomous gaps are used to perform measurements, the UE is allowed to temporarily abort communication with the serving cell. That is, the UE may create autonomous gaps to perform the corresponding measurements within the limits specified in 3GPP TS 36.331.

Currently, autonomous gaps are used by a UE to allow the UE to read the system information of a cell. In an additional or alternative embodiment, the UE makes use of autonomous gaps for measuring inter-frequencies and/or intra-frequencies. For example, this could happen in the case when measurement gaps and connected DRX are not configured by the network. If measurement gaps and/or connected DRX are configured by the network, the UE may use autonomous gaps, in addition, for measurements. In an embodiment, the UE may behave in such a manner only for intra-frequency measurements in order to obtain information in advance for future E-CID procedures. For example, the UE may obtain the identity of intra-frequency neighbor cells that have a good reception power level and/or quality. The UE may include an obtained cellGlobalId of a neighbor cell or indicate whether or not a cell measurement is from a femto cell. In an embodiment, in order to limit any loss of data, autonomous gaps may be used only when the radio coverage is adequate, such as when the serving cell quality and/or power is above a given threshold. This embodiment may be linked with the s-Measure embodiments disclosed above and/or may be enabled only after an emergency service has been started.

Combinations of two or more of the embodiments disclosed above are possible. For example, if measurement gaps are available to the UE for measurements, then the UE will use the measurement gaps to collect neighbor cell measurements. If measurement gaps are not available, then the UE will use connected DRX for measurements. If connected DRX is not configured by the network, then the UE will use autonomous gaps for measurements. If no autonomous gaps could be configured by the UE, then the UE will perform intra-frequency measurements only. This example embodiment, being a combination of the embodiments above, may also be enabled when an emergency service is started and disabled when the emergency service terminates.

In another embodiment, the UE may not wait for the frequencies in the connected mode measurement object configuration from the network before measuring or reporting for connected mode reporting. Instead, the UE may use the idle mode neighbor cell list provided by the network in SIB5, using, for example, an inter-frequency database. The inter-frequency database contains the frequencies of the neighbor cells. The frequency of the serving cell is not found here. The measurements may be configured using the neighbor cell and/or frequency provided in the SIB5 of the serving cell. The UE may then reuse the idle mode frequencies/cells in connected mode for intra-frequency measurements or reporting. There is typically not much difference between the idle mode frequencies/cells and connected mode frequencies/cells indicated by the network to align idle mode cell reselection and connected mode handover behaviors. Note that reselection is the cell association done by a moving UE while it is in idle mode. Handover is the cell association of a moving UE while it is in connected mode. The idle mode frequencies/cells may not be much more extensive than the connected mode frequencies/cells. Therefore, it may be expected that most, if not all, idle mode frequencies/cells may be useful for connected mode. This embodiment may be enabled when an emergency service is started and disabled when the emergency service terminates.

In another embodiment, only the SIB5 frequencies/cells that were provided to the UE within a permissible time window may be considered, e.g., by use of a timer. In another embodiment, if the SIB5 of the serving cell is not available and no connected measurement object configuration is received, the UE may configure only intra-frequency measurements, since SIB5 is not required for such measurements.

An embodiment of pseudo-code that may be used to specify UE behavior upon establishment of an emergency service is shown in FIG. 5. The pseudo-code covers both the establishment of an RRC connection for an emergency service and the case where an RRC connection is already established for non-emergency services and an emergency service is being established on the already existing RRC connection. Such behavior may terminate when all packet data network (PDN) connections for emergency bearer services are deactivated.

The terminology provided in FIG. 5 is only an example. Another example is given in FIG. 6. This behavior may also terminate when all PDN connections for emergency bearer services are deactivated.

As an alternative to step "b" in FIGS. 5 and 6, the UE may ignore the test on s-Measure and perform the measurements as if s-Measure is not configured or as if s-Measure is configured and is above the threshold. This is alternative illustrated in FIG. 7.

If the connection is for an emergency service, the UE may perform measurements regardless of the s-Measure configuration, so the extra condition "if s-Measure is configured and" may be removed. This alternative is illustrated in FIG. 8. Another alternative phrasing is illustrated in FIG. 9.

To ensure that the emergency service is not affected, some or all of the procedures described above may apply only if the UE has sufficient battery power and/or if the UE does not benefit from power saving and/or if the UE is connected to a power supply. For example, if the UE's battery level is extremely low, the UE may omit non-mandatory neighbor cell measurements altogether. That is, neighbor cell measurements that have not been configured by the network in measConfig may not be performed. If the UE's battery level is slightly higher, the UE may restrict non-mandatory neighbor cell measurements to intra-frequency only. Otherwise, the UE may apply all of the measurement procedures described above. Other granularities in what to report or not report are also possible and may depend on multiple different battery levels. In the examples illustrated in FIGS. 10a and 10b, the UE allows all measurements for emergency services if the battery power is high enough.

In an embodiment, the UE may start a timer at the beginning of an emergency service and ignore the s-Measure restriction as described above only while the timer is running. When the timer expires, the UE may revert to s-Measure controlled measurements. This behavior may ensure that additional measurements do not continue to be performed if the emergency center decides not to request location information. If the timer is still running when the location procedure concludes, the UE may ignore the timer and resume using the s-Measure controlled measurements.

In one embodiment, a primitive is used by the Non-Access-Stratum to inform the Access-Stratum that a PDN connection for emergency bearer services was established. A primitive is an inter-layer message. This could be done internally to the UE and/or added in the specifications.

A second set of embodiments is directed toward preserving idle mode measurements. In an embodiment, the UE may not discard its idle mode measurements when the UE enters connected mode. Instead, the UE provides the idle mode measurements to a network node after entering connected mode. Measurements made in idle mode within a permissible time threshold may still be applicable for reporting for E-CID purposes. This time threshold, $T_{thresh}$, may be 10 seconds or some other duration that avoids System Frame Number (SFN) wrap-around. This embodiment may reuse intra-frequency and/or inter-frequencies (SIB5 frequencies) from the first set of embodiments, but this embodiment goes further in the sense that not only are idle mode frequencies reused, but idle mode measurements are reused once the UE is in connected mode. Steps that promote such UE behavior are illustrated in FIG. 11. Algorithm steps to implement this embodiment are illustrated in FIG. 12.

It may be noted that the UE may also deduct connected L3 filtered measurements from idle mode non-L3 filtered parameters, since the former is a smoothed (e.g., weighted average) version of the latter. That is, input data may be combined with filter weights to produce an output. Idle mode results are instantaneous. The connected mode L3 measurements have been smoothed. In one embodiment, the UE achieves this by buffering recent samples of idle mode samples and then reusing them in connected mode. Alternatively, the UE uses instantaneous measurements in connected mode.

Another embodiment may make use of the Minimum Drive Test (MDT) functionality. This functionality allows the network to request the UE to send measurement reports on the quality and power (RSRP and RSRQ) of the serving and/or neighbor cells, in idle and connected modes. While in connected mode for an emergency service, the network may reuse this idle mode information.

A third set of embodiments is directed toward a network-assisted solution for emergency services with a location method such as E-CID. In an embodiment, at the time of emergency service establishment, the network sends an rrcConnReconfiguration message to a UE with appropriate neighbor frequencies by setting up corresponding measurement objects. In another embodiment, the network does not include the s-Measure criterion in the rrcConnReconfiguration message in order to allow the UE to measure all the neighbor frequencies irrespective of the serving cell RSRP value. In another embodiment, the network (using the rrcConnReconfiguration message) may configure Gap Pattern #0 to allow more time for inter-frequency measurements of E-UTRA cells. In another embodiment, the network may configure an appropriate connected DRX that allows time to measure without affecting or delaying call-related signaling. Two or more of these embodiments may be combined. Such configurations ensure that all UEs are consistently measuring configured neighbor cells and providing the measurement results when an E-CID Location Information request is received later. Such an embodiment may be added to the LTE specifications, such as 3GPP TS 36.355, 3GPP TS 36.305, 3GPP TS 36.331, or 3GPP TS 36.455.

A fourth set of embodiments is directed toward the periodic background acquisition of a neighbor cellGlobalId. These embodiments rely on the fact that cellGlobalId is a unique identity of a cell and does not change often. In an embodiment, as a UE is measuring its neighbor cells as part of the measConfig given to the network during idle and connected modes, the UE autonomously acquires the SIB1 of the neighboring cells in the background. The UE then provides the cellGlobalId information to the network. The UE acquires cellGlobalId values from the SIB1 information and stores the cellGlobalId values for a specified period of time, called for example $T_{sib1\,Validity}$, such as 30 minutes. After $T_{sib1\,Validity}$, the UE reacquires the neighbor cell SIB1, stores the new cellGlobalId for $T_{sib1\,Validity}$, and checks if cellGlobalId has changed.

In other words, a UE measures neighbor cells during idle and connected modes as per the configuration given by the network. While performing neighbor cell measurements, the UE acquires the SIB1 of neighbor cells and can then transmit later the cellGlobalId from the SIB1 of the cell to the network. The network can then use the cellGlobalId of the cell. In a further embodiment, the UE may also provide the timestamp of when the cellGlobalId value(s) were captured. This would allow the network to assess the validity of the information, for example using only the information that has been received within a predefined time duration, or giving more weight to recent information compared to older information.

Combinations of the embodiments disclosed above are possible. For example, SIB1 is scheduled every 80 milliseconds (ms). In an embodiment, the UE acquires SIB1 of a cell in the background mode in various Idle/Connected DRX periods. Such acquisition may occur without disturbing radio communication with the serving cell. To ensure fast reception of SIB1 of a neighbor cell, the UE may commence SIB1 acquisition only when the neighbor cell conditions are reliable, for example when RSRP is greater than −80 dBm.

Assuming that a UE has a 1.28 second DRX cycle and that it takes 160 ms to get the MIB and SIB1 of a cell, then the UE can acquire SIB1 of 8 cells (1280/160) in one DRX period. The UE may need three DRX cycles to acquire SIB1 for all 32 neighboring cells.

The periodic background acquisition of neighbor cellGlobalIds described above may be triggered every few minutes in order to conserve the UE's battery power. Continuously acquiring the SIB1 of the cells at a regular or periodic rate as new neighbor cells are detected may not consume a large amount of UE power but may improve E-CID performance by reducing the time required to acquire neighbor cell measurements when E-CID is requested. Consequently, the cellGlobalId information may be included together with the corresponding information on one or more related cells. The cellGlobalId information may be transmitted by the UE via the RRC or LPP protocol, for example.

In an additional or alternative embodiment, the UE may indicate in the reporting to the eNB (via RRC) or to the E-SMLC (via LPP) whether or not a cell measurement is from a femto cell. The UE can currently know if a cell is a femto cell by reading SIB1 of that cell. For example, the femto cell may broadcast a CSG ID. As the location of a femto cell may be known much less accurately than that of a non-femto cell, knowledge that a cell is a femto cell may allow the eNB or SMLC to know that location information related to a femto cell is less reliable. The eNB or SMLC may then ignore measurements made for femto cell(s) or may assign less weight to measurements made for a femto cell than to measurements made for a macro cell. Such an enhancement, if implemented via RRC, may require a change in 3GPP TS 36.331 and, if implemented via LPP, may require a change in 3GPP TS 36.355. In another embodiment, the UE would not add the CellGlobalId related to femto cells in the reporting via, e.g., LPP or RRC. In another embodiment, the UE may exclude femto cells by using the SIB1 of those cells when measurements are reported to the eNB or the E-SMLC.

In another embodiment, the UE may choose not to perform periodic background acquisition of cellGlobalId of some neighbor cells if the UE receives csg-PhysCellId-Range. This information element is broadcast in SIB4 of the serving cell and indicates the range of physical cell identities assigned to femto cells. So, the UE may choose not to perform periodic background acquisition of cellGlobalId of neighbor cells whose PhysCellId falls within the range referenced in the PhysCellIdRange. Since macro cells are controlled by operators, ambiguity is less likely with macro cells than with femto cells. Therefore, the UE may choose to perform cellGlobalId reporting only for macro cells when performing E-CID procedures or similar procedures. The eNB may then exclude cell measurements from the cells whose location coordinates are not available. In another embodiment, the eNB may exclude cell measurements of cells whose physical cell identities are in the range of csg-PhysCellIdRange (as they would relate to femto cells) or may assign less weight to measurements made for a femto cell than to measurements made for a macro cell. Alternatively, the UE may exclude femto cells by using the csg-PhysCellIdRange parameter of the serving cell when measurements are reported to the eNB or the E-SMLC.

The UE may choose to start performing periodic background acquisition of cellGlobalId of neighbor cells when the UE changes PLMN or when the UE is not able to receive csg-PhysCellIdRange in the same PLMN for a specified period of time, such as 24 hours.

A fifth set of embodiments is directed toward initiating the measurement of a reception/transmission time difference upon emergency service initiation. In E-CID measurement, the UE may be required to measure the reception/transmission time difference for a serving cell or primary serving cell. In order to shorten the latency, the UE may start measuring the reception/transmission time difference in the serving cell or primary serving cell upon a request for emergency bearer service initiation by an upper layer or when the UE requests the establishment of a PDN connection for emergency bearer services. Such measurement may stop when the PDN connection for emergency bearer services is deactivated. In other words, this embodiment may apply if one or more PDN connections for emergency bearer services exist. This embodiment may also apply only if the battery power in the UE is sufficient or if the UE is connected to a power supply so that such measurements do not jeopardize the success of the emergency service.

Figure 13:
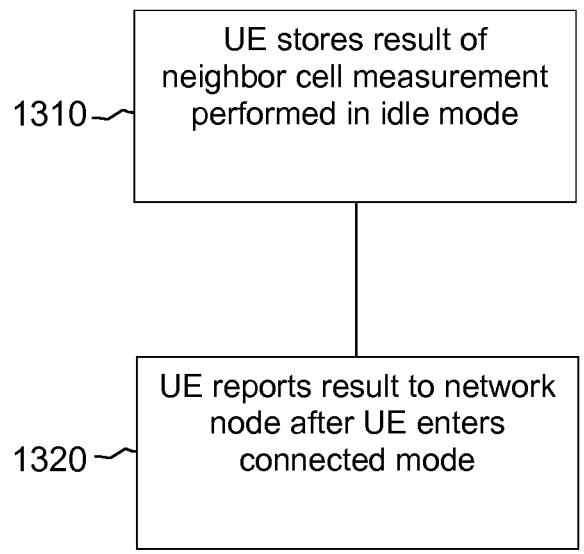
FIG. 13 is a flowchart depicting a method for communication in a wireless telecommunications system, according to an embodiment of the disclosure.

FIG. 13 illustrates an embodiment of a method for communication in a wireless telecommunications system. At block 1310, a UE stores at least one result of at least one neighbor cell measurement performed in an idle mode. At block 1320, the UE reports the at least one result to a network node after the UE enters a connected mode.

It may be noted that, although the above references to 3GPP Technical Specifications may refer to Release 11 as an example, similar principles may apply to earlier or later versions or releases of the specifications. The applicability of the embodiments disclosed herein is therefore not limited to 3GPP Release 11. It may also be noted that, although the embodiments disclosed herein may refer to a specific positioning method, such as E-CID, or specific protocols, such as RRC, LPP, or LPPa, the embodiments disclosed herein may apply to other positioning methods or protocol layers relying on UE measurements. It may further be noted that, although the embodiments disclosed herein refer to LTE, similar concepts may apply to other radio access technologies or systems, such as, but not limited to, 3GPP GERAN (GSM/EDGE), 3GPP UTRAN, 3GPP2 CDMA2000, IEEE 802.11x, or WiMAX.

Figure 14:
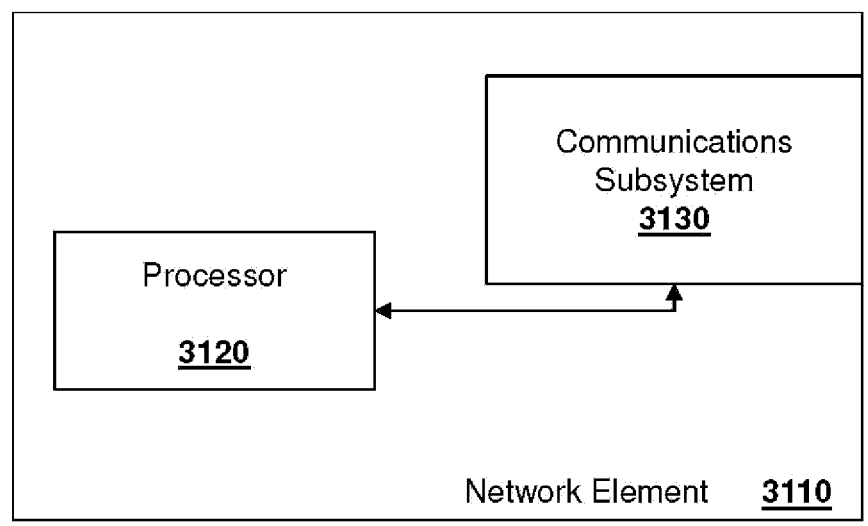
FIG. 14 is a simplified block diagram of an exemplary network element according to one embodiment.

The above may be implemented by a network element. A simplified network element is shown with regard to FIG. 14. In the figure, network element 3110 includes a processor 3120 and a communications subsystem 3130, where the processor 3120 and communications subsystem 3130 cooperate to perform the methods described above.

Figure 15:
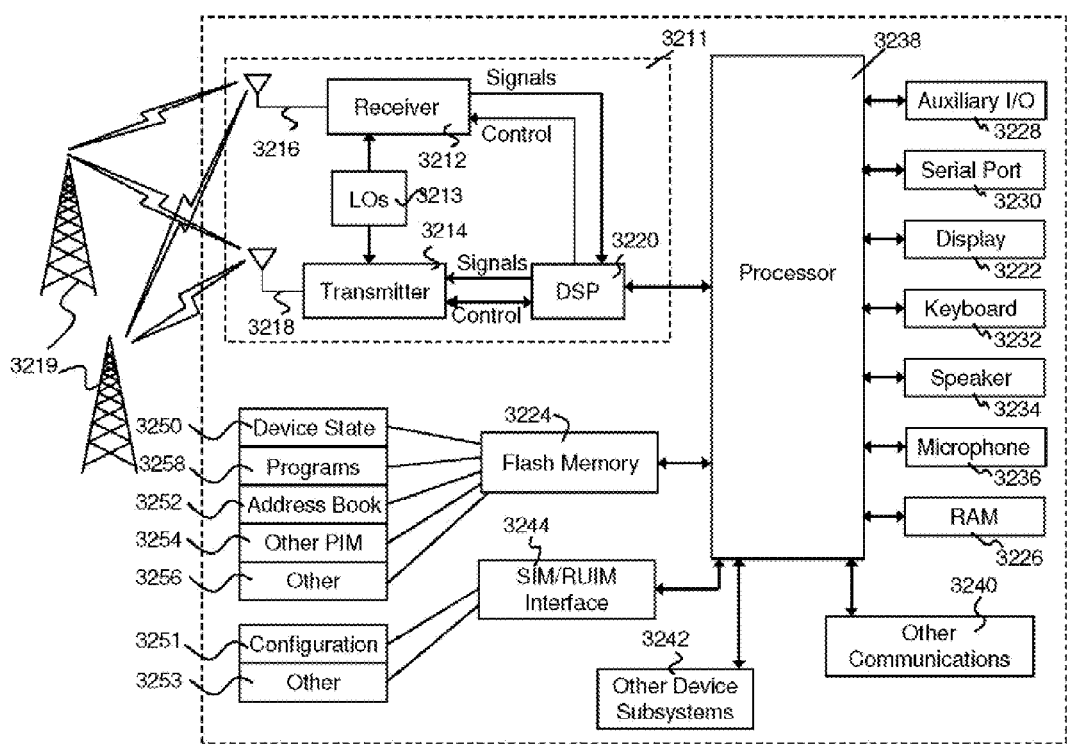
FIG. 15 is a block diagram with an example user equipment capable of being used with the systems and methods in the embodiments described herein.

Further, the above may be implemented by a UE. One exemplary device is described below with regard to FIG. 15. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 16:
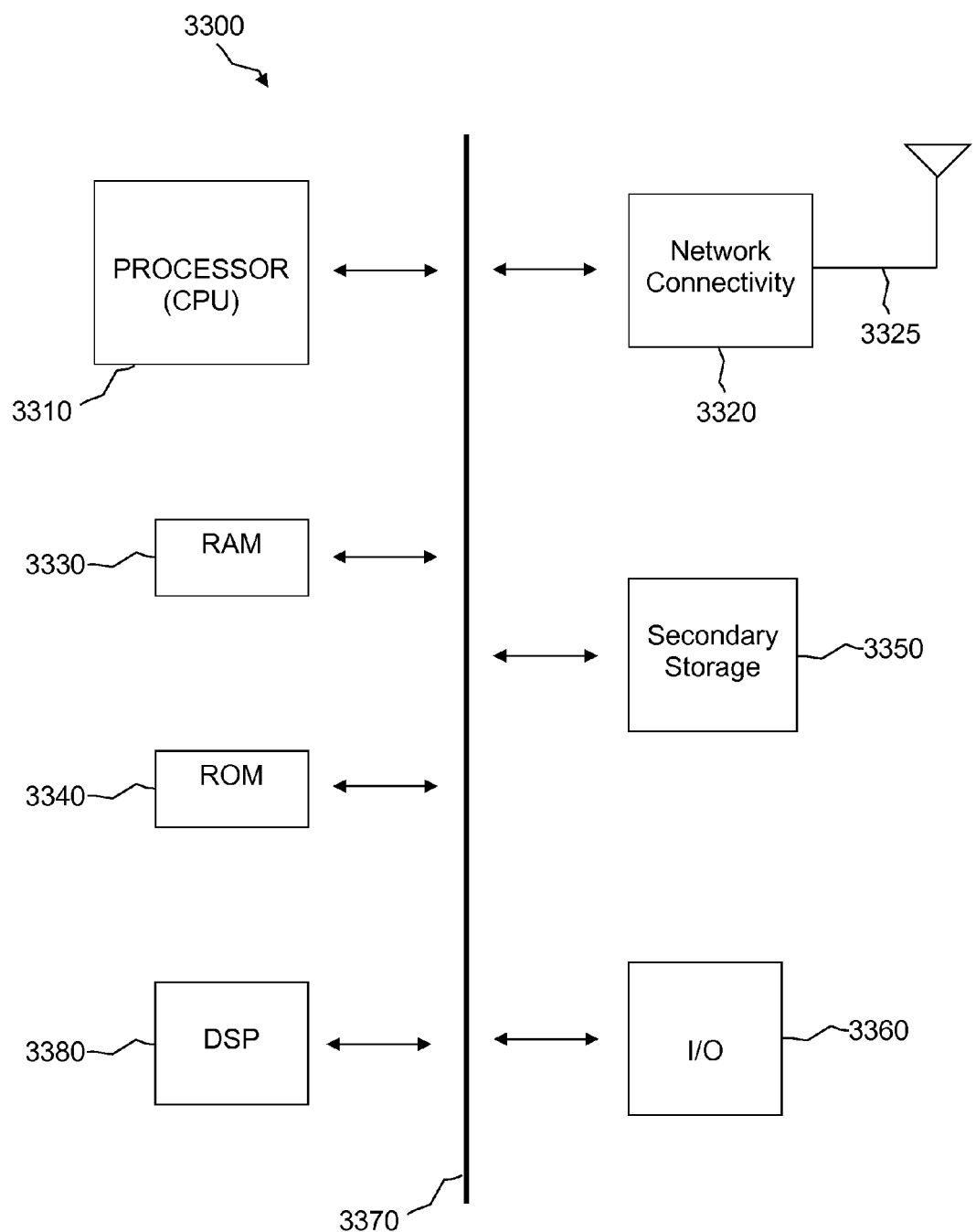
FIG. 16 illustrates a processor and related components suitable for implementing the several embodiments of the present disclosure.

The UE and other components described above might include a processing component that is capable of executing instructions related to the actions described above. FIG. 16 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for communication in a wireless telecommunications system is provided. The method comprises performing, by a UE, responsive to the UE being engaged in an emergency service, at least one neighbor cell measurement regardless of a value of an RSRP in relation to a cell measurement parameter and regardless of a configuration status of the cell measurement parameter.

In another embodiment, a UE is provided. The UE comprises a processor configured such that the UE, responsive to being engaged in an emergency service, performs at least one neighbor cell measurement regardless of a value of an RSRP in relation to a cell measurement parameter and regardless of a configuration status of the cell measurement parameter.

In another embodiment, a computer-readable medium is provided. The computer-readable medium comprises instructions that, when executed by a processor, cause a UE, responsive to being engaged in an emergency service, to perform at least one neighbor cell measurement regardless of a value of an RSRP in relation to a cell measurement parameter and regardless of a configuration status of the cell measurement parameter.

In another embodiment, a method for communication in a wireless telecommunications system is provided. The method comprises using, by a UE, at least one autonomous gap to perform at least one inter-frequency neighbor cell measurement when at least one of a measurement gap or DRX is not configured by a network node. The UE may perform the at least one inter-frequency neighbor cell measurement responsive to the UE being engaged in an emergency service. The at least one autonomous measurement gap may be used only when radio coverage in a serving cell for the UE is above a threshold. If measurement gaps, autonomous gaps and DRX are not present, the UE may measure intra-frequency only.

In another embodiment, a method for communication in a wireless telecommunications system is provided. The method comprises reporting, by a UE in connected mode, a measurement to a network node, wherein the condition of the UE at the time of measurement was one of the UE was in idle mode or the UE was measuring power on an idle mode frequency. The reporting of the measurement may occur responsive to the UE being engaged in an emergency service. The reporting of the measurement may occur when the measurement was performed in the idle mode and occurred less than a specified time before the UE entered the connected mode. The reporting of the measurement may occur responsive to a request from the network node, and the request may use minimum drive test functionality.

In another embodiment, a method for communication in a wireless telecommunications system is provided. The method comprises transmitting, by a network node to a UE, responsive to the UE being engaged in an emergency service, a configuration message for measurements of neighbor cells by the UE, wherein the configuration message does not include a parameter specifying a reference signal received power level below which the UE is to begin performing neighbor cell measurements. The configuration message may be an rrcConnReconfiguration message. In another embodiment, the network node may provide the UE with a DRX configuration that allows the UE to perform cell measurements without affecting the UE's ability to perform call-related signaling.

In another embodiment, a method for communication in a wireless telecommunications system is provided. The method comprises acquiring, by a UE, during a measurement of a neighbor cell, a system information block of the neighbor cell and providing, by the UE to a network node, information contained in the system information block. The network node may acquire a cell identity from the information contained in the system information block and store the cell identity. In another embodiment, the cell identity may be stored for a specified period of time. When the specified period of time expires, the UE may acquire another cell identity of the neighbor cell and store the other cell identity for the specified period of time. The UE may acquire the system information block only when a reference signal received power in the neighbor cell is greater than a threshold. The UE may acquire the system information block or parameter at a periodic rate. The UE may indicate whether a cell measurement is for a femto cell. When the UE indicates that the cell measurement is for a femto cell, the network node may at least one of: ignore the cell measurement or assign a lower weight to the cell measurement than to another cell measurement. The network node may exclude cell measurements of cells that have at least one of: a physical cell identity in the range of csg-PhysCellIdRange or an indication of being a femto cell. The UE may not report cell measurements for femto cells to the network node. The UE may acquire the system information block of the neighbor cell when at least one of: the UE changes its PLMN or the UE is not able to receive csg-PhysCellIdRange in the same PLMN for a specified period of time.

In another embodiment, a method for communication in a wireless telecommunications system is provided. The method comprises starting, by a UE, measurement of a reception/transmission time difference in a cell responsive to at least one of: a request by an upper layer for emergency bearer service initiation or a request by the UE for establishment of a PDN connection for emergency bearer services. The measurement of the reception/transmission time difference may terminate when the PDN connection for emergency bearer services is deactivated. The measurement of the reception/transmission time difference may occur only when at least one of: battery power in the UE is greater than a threshold or the UE is connected to a power supply.

The following are incorporated herein by reference for all purposes: 3GPP Technical Specification (TS) 24.301, 3GPP TS 36.355, 3GPP TS 36.305, 3GPP TS 36.331, 3GPP TS 36.133, and 3GPP TS 36.455.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunications system, the method comprising:
   performing, by a user equipment (UE), responsive to the UE being engaged in an emergency service, at least one neighbor cell measurement regardless of a value of a reference signal received power (RSRP) in relation to a cell measurement parameter and regardless of a configuration status of the cell measurement parameter.

2. The method of claim 1, wherein the cell measurement parameter is the s-Measure parameter that defines when the UE is required to measure neighbor cells, and wherein the UE performs the at least one neighbor cell measurement responsive to being engaged in the emergency service even if the UE is not required to measure neighbor cells according to the configuration status of the s-Measure parameter.

3. The method of claim 1, further comprising storing at least one result of the at least one neighbor cell measurement and reporting the at least one result to a network node in response to a request from the network node for the at least one result.

4. The method of claim 1, wherein the UE performs the at least one neighbor cell measurement only under a condition of at least one of:
   the UE having battery power above a threshold;
   the UE not benefiting from power saving; or
   the UE being connected to a power supply.

5. The method of claim 1, wherein the UE starts a timer responsive to initiation of the emergency service and ignores the cell measurement parameter only while the timer is running.

6. A user equipment (UE) comprising:
   a processor configured such that the UE, responsive to being engaged in an emergency service, performs at least one neighbor cell measurement regardless of a value of a reference signal received power (RSRP) in relation to a cell measurement parameter and regardless of a configuration status of the cell measurement parameter.

7. The UE of claim 6, wherein the cell measurement parameter is the s-Measure parameter specifying that the UE is not required to measure neighbor cells if the s-Measure parameter is configured unless the value of the RSRP is below an s-Measure threshold, and wherein the UE performs the at least one neighbor cell measurement responsive to being engaged in the emergency service even if the value of the RSRP is not below the s-Measure threshold when the s-Measure parameter is configured.

8. The UE of claim 6, wherein the UE stores at least one result of the at least one neighbor cell measurement and reports the at least one result to a network node in response to a request from the network node for the at least one result.

9. The UE of claim 6, wherein the UE performs the at least one neighbor cell measurement only under a condition of at least one of:
   the UE having battery power above a threshold;
   the UE not benefiting from power saving; or
   the UE being connected to a power supply.

10. The UE of claim 6, wherein the UE starts a timer responsive to initiation of the emergency service and ignores the cell measurement parameter only while the timer is running.

11. A non-transitory computer-readable medium comprising:
   instructions that, when executed by a processor, cause a user equipment (UE), responsive to being engaged in an emergency service, to perform at least one neighbor cell measurement regardless of a value of a reference signal received power (RSRP) in relation to a cell measurement parameter and regardless of a configuration status of the cell measurement parameter.

12. The non-transitory computer-readable medium of claim 11, wherein the cell measurement parameter is the s-Measure parameter that defines when the UE is required to measure neighbor cells, and wherein the UE performs the at least one neighbor cell measurement responsive to being engaged in the emergency service even if the UE is not required to measure neighbor cells according to the configuration status of the s-Measure parameter.

13. The non-transitory computer-readable medium of claim 11, wherein the UE stores at least one result of the at least one neighbor cell measurement and reports the at least one result to a network node in response to a request from the network node for the at least one result.

14. The non-transitory computer-readable medium of claim 11, wherein the UE performs the at least one neighbor cell measurement only under a condition of at least one of:

the UE having battery power above a threshold;

the UE not benefiting from power saving; or the UE being connected to a power supply.

15. The non-transitory computer-readable medium of claim 11, wherein the UE starts a timer responsive to initiation of the emergency service and ignores the cell measurement parameter only while the timer is running.

* * * * *